(12) United States Patent
Higgins et al.

(10) Patent No.: US 9,589,484 B2
(45) Date of Patent: Mar. 7, 2017

(54) SIMULATION DEVICE

(71) Applicant: Cardiovascular Systems, Inc., St. Paul, MN (US)

(72) Inventors: Joseph Higgins, Minnetonka, MN (US); Nicholas Rydberg, Oakdale, MN (US)

(73) Assignee: Cardiovascular Systems, Inc., St. Paul, MN (US)

( * ) Notice: Subject to any disclaimer, the term of this patent is extended or adjusted under 35 U.S.C. 154(b) by 249 days.

(21) Appl. No.: 14/163,175

(22) Filed: Jan. 24, 2014

(65) Prior Publication Data

US 2015/0213733 A1    Jul. 30, 2015

(51) Int. Cl.
    *G09B 23/30*  (2006.01)

(52) U.S. Cl.
    CPC ................... *G09B 23/303* (2013.01)

(58) Field of Classification Search
    CPC ...................................... G09B 23/30
    USPC ........................................ 434/272
    See application file for complete search history.

(56) References Cited

U.S. PATENT DOCUMENTS

| | | | |
|---|---|---|---|
| 4,198,766 A | 4/1980 | Camin | |
| 4,642,055 A | 2/1987 | Saliterman | |
| 4,726,772 A * | 2/1988 | Amplatz | 434/272 |
| 5,055,051 A | 10/1991 | Duncan | |
| 5,112,228 A | 5/1992 | Zouras | |
| 6,062,866 A | 5/2000 | Prom | |
| 6,336,812 B1 | 1/2002 | Cooper et al. | |
| 6,517,354 B1 * | 2/2003 | Levy | 434/262 |
| 6,538,634 B1 | 3/2003 | Chui et al. | |
| 6,929,481 B1 | 8/2005 | Alexander et al. | |
| 6,997,719 B2 | 2/2006 | Wellman et al. | |
| 7,591,198 B2 | 9/2009 | Weldon et al. | |
| 8,083,524 B2 | 12/2011 | Grund-Pedersen | |
| 8,439,687 B1 * | 5/2013 | Morriss et al. | 434/267 |
| 8,469,717 B2 | 6/2013 | Park et al. | |
| 2006/0127864 A1 | 6/2006 | Ohlsson | |
| 2007/0054256 A1 * | 3/2007 | Low et al. | 434/268 |
| 2008/0084959 A1 * | 4/2008 | Weldon et al. | 377/10 |
| 2008/0187896 A1 | 8/2008 | Savitsky | |
| 2011/0117531 A1 | 5/2011 | Iwasaki et al. | |
| 2012/0028231 A1 | 2/2012 | Misawa et al. | |
| 2013/0022952 A1 | 1/2013 | Ikeno et al. | |
| 2015/0161347 A1 * | 6/2015 | Christiansen et al. | G06F 19/12 |

FOREIGN PATENT DOCUMENTS

JP    2001343891    12/2001

OTHER PUBLICATIONS

Notification Concering Transmittal of International Preliminary Report on Patentability (Chapter I of hte Patent Cooperiation Treaty, mailed Aug. 4, 2016 in PCT Application No. PCT/US2015/012657, filed Jan. 23, 2015.

* cited by examiner

*Primary Examiner* — Xuan Thai
*Assistant Examiner* — Robert P Bullington
(74) *Attorney, Agent, or Firm* — Barnes & Thornburg LLP; Jeffrey R. Stone (57) ABSTRACT

A simulation system may include a base with a working surface, an artery element configured to simulate an artery with a blockage and adapted to receive a distal portion of a handheld manually manipulated device, and a vascular pathway arranged on the working surface and configured for securing the artery element to the base.

19 Claims, 9 Drawing Sheets

SIMULATION DEVICE

FIELD OF THE INVENTION

The present patent application relates generally to surgical simulation devices. More particularly, a device and method are provided for use in simulating arterial navigation and passing through and clearing of lesions and/or blockages. Still more particularly, the device and method are particularly adapted for simulating an atherectomy procedure.

BACKGROUND

Atherectomy procedures involve inserting a flexible elongate instrument into the vasculature of a patient. The tip of the elongate instrument may be advanced through the vasculature to and/or through a lesion or blockage in the vasculature. On its way to the lesion or blockage, the tip of the instrument may encounter turns in the vasculature with tight radii and/or turns immediately followed by additional redirecting turns. As the procedure is performed, the operator may be required to navigate the vasculature without damaging vasculature and, as such, may be required to advance the device within a particular range of speeds. Still further, some lesions or blockages may be more difficult than others to navigate and/or clear because of the toughness of the lesion material, the tightness of the area remaining open within the legion, the location of the legion or blockage, or the vasculature shape leading to or following the legion.

Techniques for suitably advancing an atherectomy device or other handheld manually manipulated device, navigating tortuous vasculature, and clearing legions or blockages may be relatively difficult to learn. Without proper training, procedures may take significantly longer than they otherwise would. In other situations, the procedure may need to be stopped, or worse, the procedure may cause damage to the vasculature of the patient. In still worse situations, the patient may not survive if the vasculature is perforated or otherwise damaged such that circulation is lost or reduced.

BRIEF SUMMARY OF THE INVENTION

In one embodiment, a simulation system may include a base with a working surface. The system may include an artery element configured to simulate an artery with a blockage and adapted to receive a distal portion of a handheld manually manipulated device. The system may also include a vascular pathway arranged on the working surface and configured for securing the artery element to the base.

In another embodiment, a simulation system for use with an artery element may be provided. The artery element may be configured to simulate an artery with a blockage and may also be adapted to receive a distal portion of a handheld manually manipulated device. The simulation system may include a base with a working surface and a vascular pathway arranged on the working surface. The vascular pathway may be configured for securing the artery element to the base.

BRIEF DESCRIPTION OF FIGURES

FIG. 3 is a top view of the base of FIG. 2.

DETAILED DESCRIPTION

The present application, in one or more embodiments, discusses a simulation device usable to train operators to perform atherectomy or other cardiovascular procedures. The system may include a vascular form defining several different vascular pathways into which mocked up arteries may be placed. The mocked up arteries may have mocked up lesions or blockages in them for purposes of training and the vascular pathways may hold the mocked up arteries in a particular position matching that of the vascular pathway. A user may learn and/or practice an atherectomy procedure by guiding a distal tip of an atherectomy device or other handheld manually manipulated device through an introducing device, into a mocked up artery in a selected pathway and into and/or through one or more mocked up lesions or blockages within the artery. An atherectomy device such as a Diamond Back device supplied by Cardiovascular System, Inc. may be used with the system for example. The system may include a speed sensing element and output device allowing the user to monitor how quickly the device is being advanced so as to get a better feel for how quickly the user may or may not advance the device under actual surgical circumstances. In some embodiments, the simulation device may include adjustability features for increasing or decreasing the difficulty of navigating through a lesion or blockage and may include other accessories.

Figure 1:
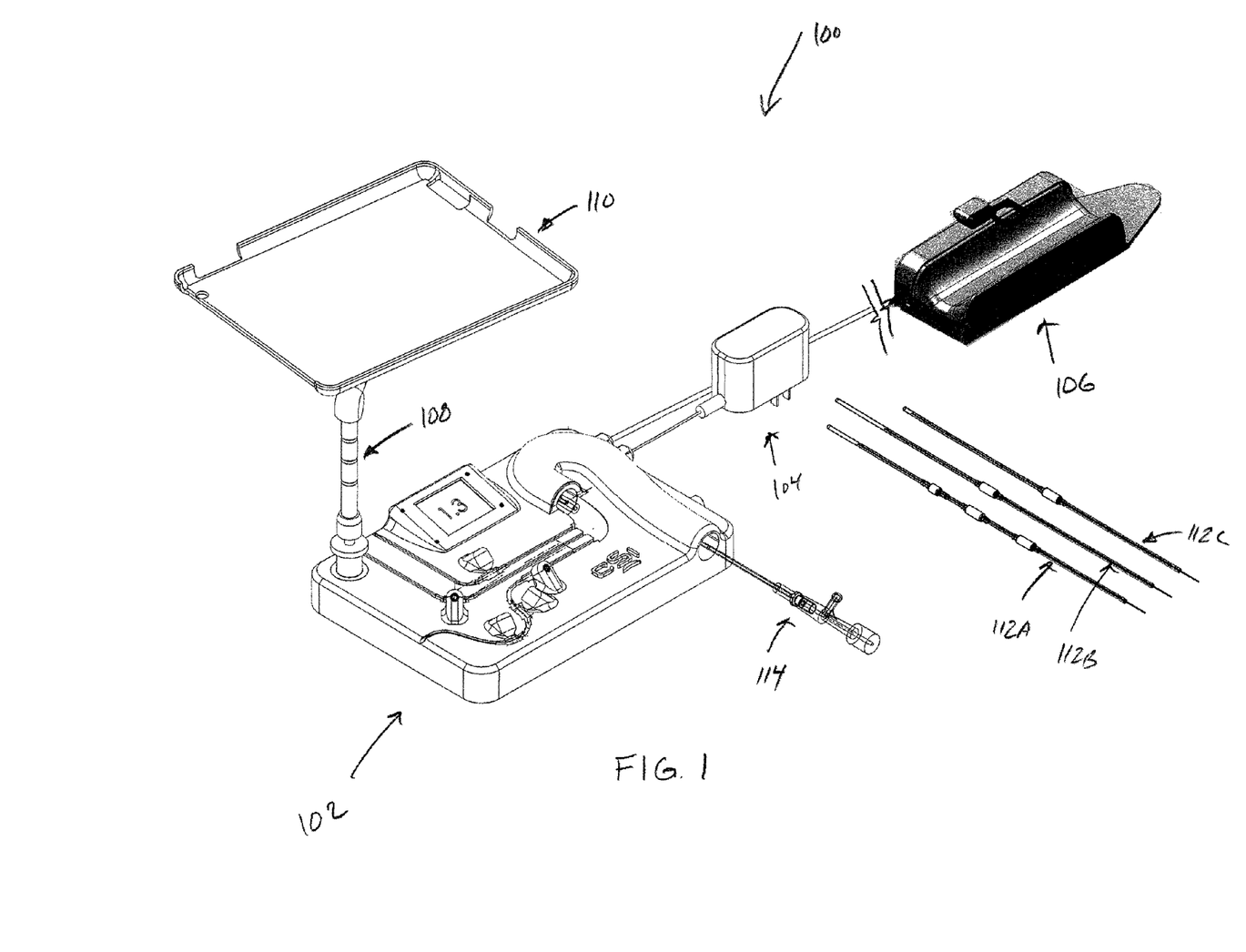
FIG. 1 is a perspective view of a simulation system, according to some embodiments.

Referring now to FIG. 1, one embodiment of a simulation device 100 is shown. As shown, the device 100 may include a vascular form base 102, a power source 104, and a control holder 106. The device 100 may also include an articulable arm 108 with a bracket 110 for supporting a video camera, tablet computer, or other viewing-type device. Still further, the device 100 may be part of a system including one or more artery elements 112A, 112B, 112C and an introducing element 100. The device may be configured for use with the artery elements 112, the introducing element 114 and an atherectomy device for simulating atherectomy procedures. In particular, the artery elements 112 may be placed in a selected vascular pathway of the vascular form base 102 and connected to the introducing element 114. The distal tip of an atherectomy device may be inserted into the introducing element 114 and advanced into the artery element 112 to simulate an atherectomy procedure. The handle or controller portion of the atherectomy device may be placed on the control holder 106 such that the advancing speed of the distal tip of the atherectomy device may be monitored.

Figure 2:
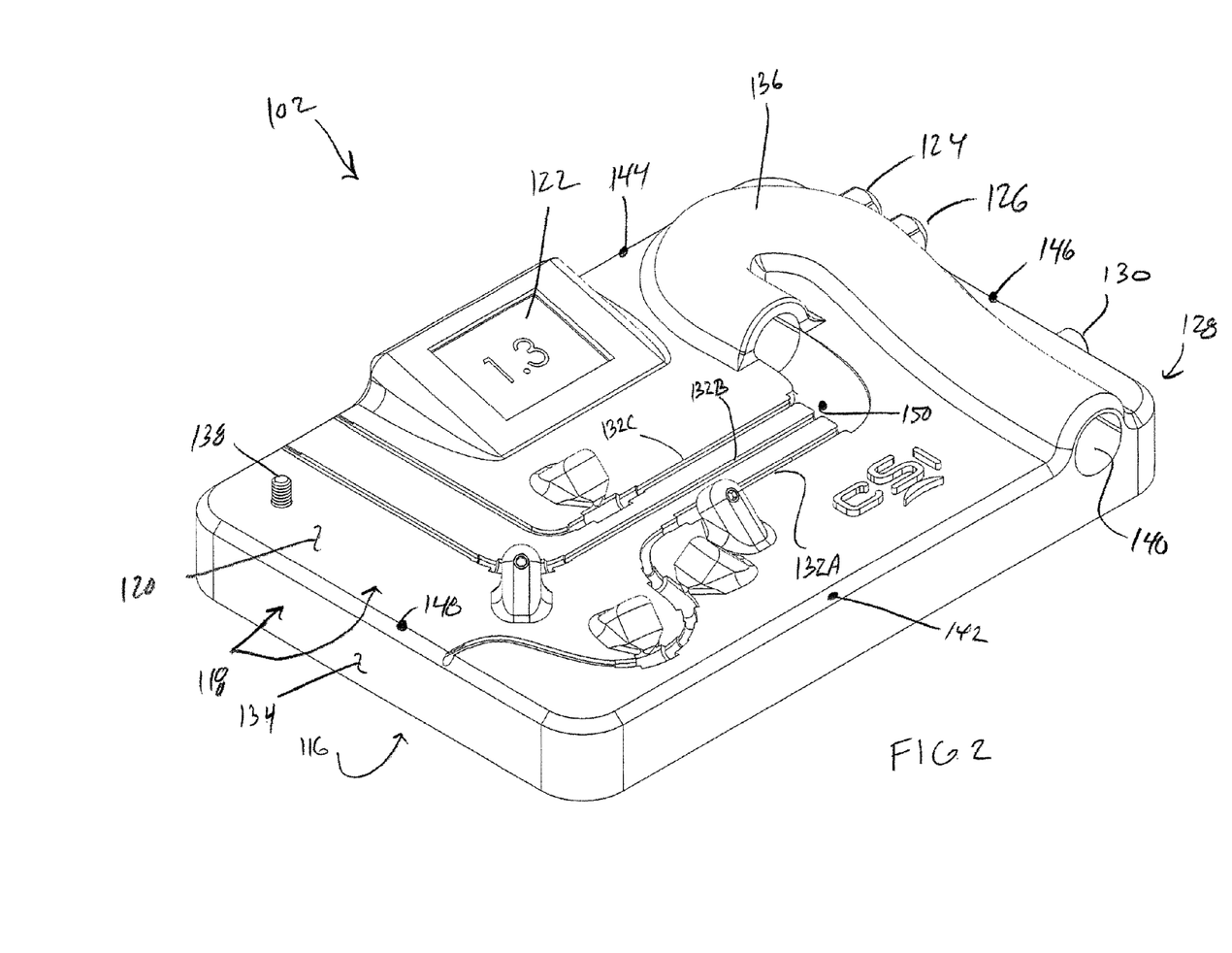
FIG. 2 is a perspective view of a base of the system of FIG. 1.

FIG. 2 includes a perspective view of the vascular form base 102 of the present embodiment. The vascular form base 102 may include a backing element 116, a housing 118 with a working surface 120, internal electronics and backlighting, and an output screen 122. The vascular form base 102 may also include a power port 124 and an input port 126 for the control holder 106. In addition, the vascular form base 102 may include an on/off switch 128 (See FIG. 3) and a lumination control.

The backing element 116 of the vascular form base 102 may be a substantially flat grounding and/or supporting board or plate providing a surface for securing internal electronics, backlighting, and other internal structures or elements. As suggested, internal electronics such as circuit boards, lighting elements, brackets, and/or bracing or other systems or devices may be supported on the backing element. The backing element may be substantially rectangular in shape having a rectangularly shaped perimeter. Other shaped backing elements may also be provided.

The housing 118 of the vascular form base 102 may be secured to the backing element 116 and may be configured to enclose the backing element 116 in addition to internal electronics or other elements that are supported by the backing element 116. In some embodiments, the vascular form base 102 may be substantially rectangular having a plurality of side walls 134 extending upward from the backing element to a top plate defining a working surface 120. The working surface 120 may be substantially flat and one or more vascular pathways 132A, 132B, 132C may be recessed into the working surface 120. In addition, the working surface 120 may include an entrance structure 136, a base element 138 for an articulable arm, and an output screen 122. The housing 118 may be constructed from a polymer material such as plastic or other easily cleanable and stain resistant material. Still other materials may be provided.

The entrance structure 136 on the working surface 120 may include a recessed canal, a portion of which may be covered such that the canal and cover may resemble a large diameter vascular vessel such as the aorta. The entrance structure 136 may begin or have a proximal end 140 at or near a bottom edge 142 of the working surface 120 and may extend upwardly across the working surface 120 toward a top edge 144 while curving slightly toward a right edge 146 of the working surface 120. The entrance structure 136 may then include a hairpin curve curing away from the right edge 146 of the working surface 120 and turning back on itself. Upon completing the hairpin curve, the cover of the entrance portion may be omitted such that the canal portion extends downwardly toward the bottom edge 142 without a cover and curves slightly toward the left edge 148 of the working surface 120 to a distal end 150 of entrance structure 136. In an actual atherectomy procedure, for example, an entrance point through the femoral artery may be used and the distal tip of the atherectomy device may be guided upward through the femoral artery to the aorta to access the coronary arteries of the heart. The arrangement of the entrance structure 136 on the working surface 120 of the device may, thus, reasonably and accurately resemble actual conditions that a cardiovascular surgeon may encounter with respect to navigating through the femoral artery and the aorta to access a lesion or blockage.

The vascular pathways 132 may extend from the distal end 150 of the entrance structure 136. In the present embodiment, three vascular pathways 132 may be provided each having differing lengths and curves modeled after likely vascular structures or conditions that a surgeon may encounter in the human body. For example, as shown in FIG. 3 for example, a first vascular pathway 132C may include a generally elongate initial leg followed by a seating area 152C for a lesion/blockage portion of an artery element 112C followed by a relatively tight curve (i.e., curve with a relatively short radius). Another vascular pathway 132B may include a generally elongate initial leg followed by a seating area 152B arranged on a curve for a lesion/blockage portion of an artery element, albeit a curve that is less tight than the curve of the first pathway. Still another vascular pathway 132A may include a relatively shorter initial leg followed by a seating area 152A1 for a lesion/blockage portion of an artery followed by a curve followed immediately by an additional curve reversing the direction of the pathway 132A from the initial curve. A seating area 152A2 for a lesion/blockage may be arranged at the juncture between the two curves. The second of the two curves may be U-shaped curved and an additional seating area 152A3 for a lesion/blockage may be arranged at or near the bottom of the U-shaped curve. Yet another curve may be provided on this pathway 132A that again reverses the direction of the curvature of the pathway 132A.

The several vascular pathways 132 may each include a trough or slot that is recessed into the working surface 120 of the vascular form base 102. Each trough or slot may have a proximal end 154 that begins at the distal end 150 of the entrance structure 136 and each trough or slot may have a distal end 156 at or near an edge of the vascular form base 102. The vascular pathways 132 may have a relatively narrow width and depth adapted to receive an artery element 112. In some embodiments, the pathways 132 may be adapted for a slight friction fit with the artery elements 112 so as to resist dislodgement of the artery 112. Removal of an artery element from such a pathway 132 may be performed by grasping the proximal end of the artery element 112 and pulling upward in a sort of zipper-like fashion to remove the artery element 112 from the pathway 132. In some embodiments, the cross section of the pathways 132 may include an initial channel having a width ranging from approximately 1 mm to approximately 20 mm and a depth ranging from approximately 1 mm to approximately 20 mm. The cross section of the pathway may also include a substantially hemispherically shaped bottom having a diameter ranging from approximately 1 mm to approximately 20 mm. Still other sizes may be provided. The dimensions of the pathways 132 may, thus, approximate the outside diameter of both the artery element 112 of the system and actual outside artery diameters. As such, when in place, the artery elements 112 may be approximately flush with the working surface 120 of the device 102. At a distal end 156 of the pathway 132, a pair of keeper elements 158 may be provided that extend partially across the top of the pathway 132 to secure the distal end of the artery element 112 in the pathway 132.

Figure 4:
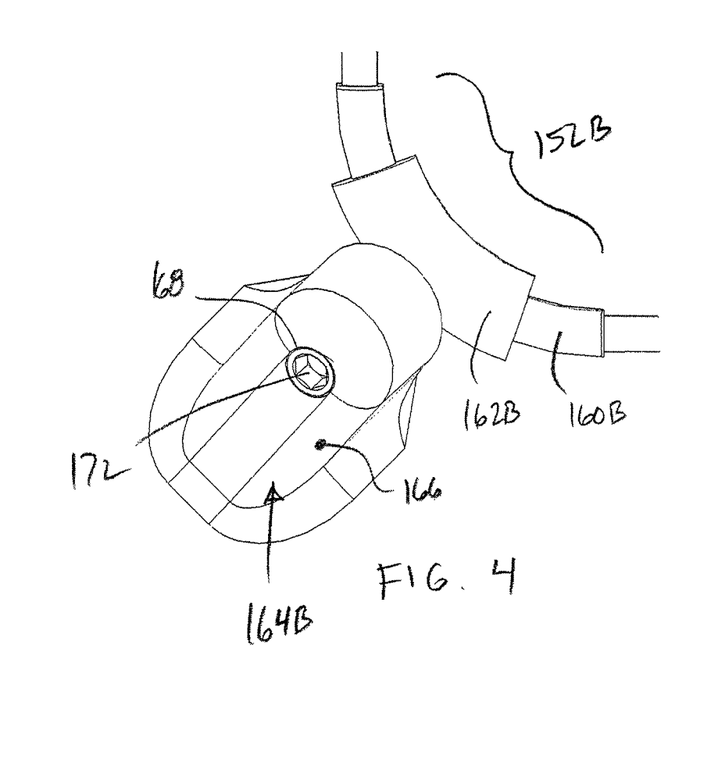
FIG. 4 is a close-up perspective view of a restricting element of the base of FIG. 2.

As shown in FIGS. 2 and 3, the pathways 132 may include one or more seating areas 152 for a lesion/blockage portion of an artery element 112. As shown in FIG. 4, for example, the seating area 152B may include primary enlarged area and a secondary enlarged area 160B to accommodate the primary and secondary diameters, respectively, of the lesion block areas of the artery elements 112 described below. Like the other portions of the pathways 132, the seating areas may be sized to receive the lesion/blockage areas of the artery element 112 in a relatively snug fit so as to maintain the position of the lesion/blockage areas in position in the pathway 132. In some embodiments, the primary enlarged area 160B may have a channel depth ranging from approximately 1.2 mm to approximately 20.2 mm. The width may similarly range from approximately 1.2 mm to approximately 20.2 mm. The hemispherical bottom may have a diameter matching the width and, thus, a center point arranged half way across the width of the channel and a arranged at the bottom of the channel. The secondary enlarged area may have a similar, but larger, shape with a depth ranging from approximately 1.4 mm to approximately 20.4 mm. The width of the secondary enlarged 162B area may similarly range from approximately 2.2 mm to approximately 21.2 mm. The hemispherical bottom may have a diameter matching the width and, thus, a center point arranged half way across the width of the channel and arranged at the bottom of the channel.

As shown, each of the seating areas 152 may also include a restricting element 164 for adjusting the narrowness of the lesion in the artery element 112. That is, the artery elements 112 that are part of the system may include lesions in them for practicing the use of the device. As the artery elements 112 are used, the arterial passage through the lesions may increase due to being eroded and/or partially removed as the user practices or performs the atherectomy procedure. The restricting elements 164 at each of the seating areas 152 may allow the lesions to be pinched to as to decrease the arterial space passing through the lesion and allow the lesion to be used several times before needing to be replaced.

Figure 6:
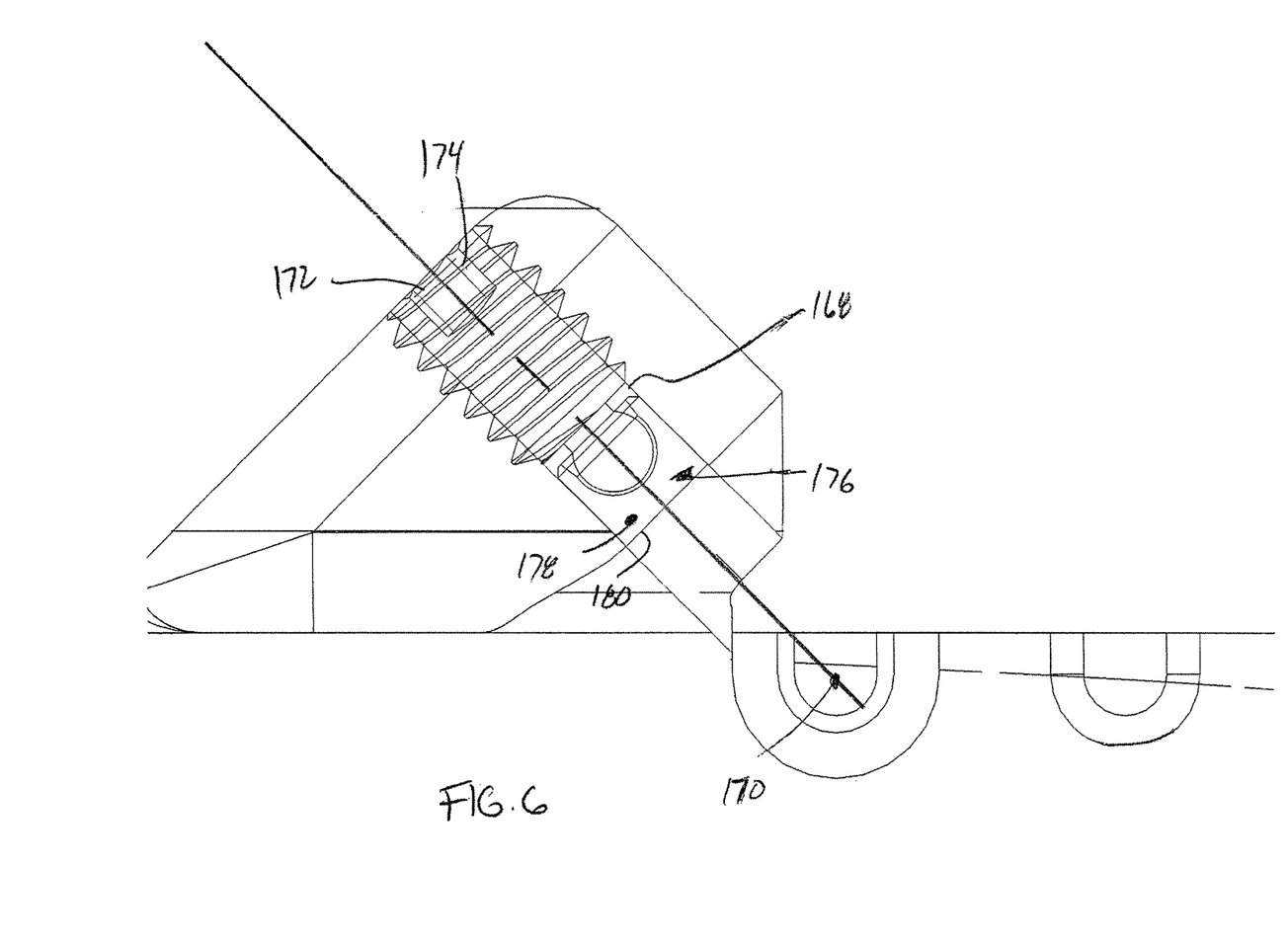
FIG. 6 is a cross-sectional view of the restricting element of FIG. 4.

As shown in FIG. 4, the restricting elements 164 may include an arm 166 extending upward from the working surface 120 and arranged to project slightly over the seating area 152 of the pathway 132. For example, the arm 166 may project upwardly from the working surface 120 and may lean outwardly over the seating area 152 at an angle from approximately 30 degrees to 60 degrees or from approximately 40 degrees to approximately 50 degrees or an angle of approximately 45 degrees may be provided. The arm 166 may be substantially rigid so as to maintain its angle of inclination with respect to the working surface. The arm 166 may include a threaded bore 168 extending therethrough. The bore 168 may be arranged near the top of the arm 166 and may be substantially perpendicular to the arm 166 thereby creating an angle with the working surface 120 similar, but opposite to that of the arm 166. As shown in FIG. 6 the bore may be substantially aligned with a center point 170 of the hemispherical bottom of the secondary enlarged area 162 such that pressure or pinching provided by the restricting element acts 164 radially on the outer surface of the lesion area of the artery element 112.

Figure 5:
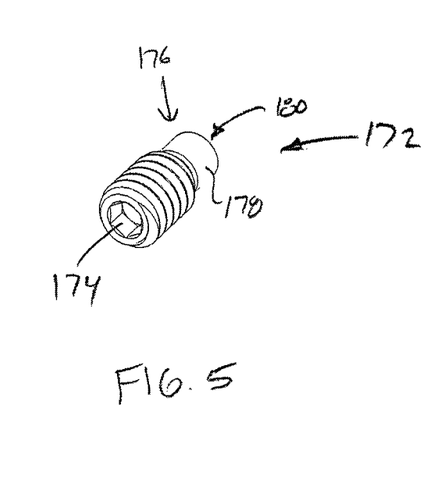
FIG. 5 is a close-up perspective view of a pressure pin of the restricting element of FIG. 4.

The restricting elements 164 may each include a pressure pin 172 arranged in the bore 168. The pressure pin 172 may be configured to advance along the axis of the bore 168 and extend out the end of the bore 168 so as to press on the outer surface of the lesion area of the artery element 112. The pressure pin 172 may include an allen screw or other screw with a threaded outer surface for engaging the threads of the bore 168 and may also include a tool engaging end 174. For example, as shown, an allen head or hex-shaped recess may be provided in a head end 174 of the pressure pin 172. Other tool engaging features may be provided at the head 174 of the pin 172. At the tip end 176 of the pin 172, a ball and socket connection to a pivotable head may be provided. As such, the tip cap 178 of the pin 172 may be free to revolve about the ball and socket connection thereby accommodating deformities or engagements with the lesion area of the artery element 112 when the pin 172 is not quite perpendicular to the outer surface of the lesion area. That is, the tip cap 178 may include a pressing surface 180 and the ball and socket connection at the tip 176 of the pin 172 may allow the pressing surface 180 to naturally approach a tangential relationship with the outside surface of the lesion area. An allen wrench or other suitable tool may be provided with the system 100 to advance the pressure pin 172 by rotating it relative to the arm 166 causing the tip 176 to extend from or retract into the bore 178 of the arm 166. As such, the pin 172 may be used to adjust the available space within the lesion area of the artery elements 112 allowing the artery elements 112 to be reused several times before the lesion material within the artery elements is substantially removed.

Figure 7:
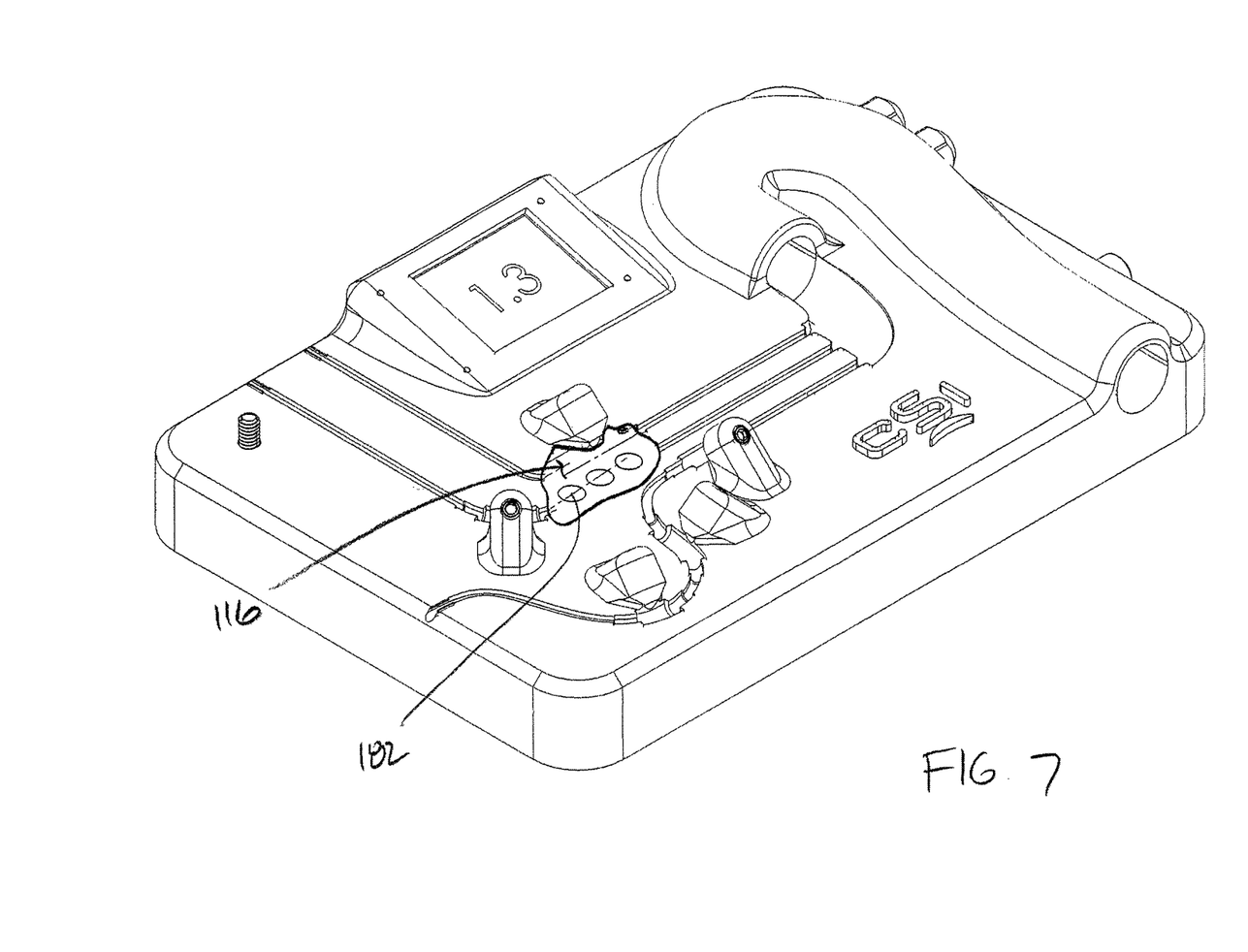
FIG. 7 is a perspective view of the base of FIG. 2 having a portion broken away.

Referring now to FIG. 7, the seating areas 152 of the vascular form base 102 may be illuminated when in use. As shown, the backing element 116 of the vascular form base 102 may have illuminators 182 in the form of LED's, light bulbs, or other illuminating elements arranged thereon and configured for emitting light upwardly against and through the working surface 120. As shown, the illuminators 182 may be arranged directly below or substantially below the seating areas 152 and may direct light upwardly from the backing element 116 to the underside of the working surface 120. The working surface 120 may include a transparent and/or translucent material allowing the light from the illuminators 182 to shine through the working surface 120 and illuminate the working surface 120 in the area of the seating areas 152. As such, when in use, the seating area 152 may be more brightly illuminated allowing the procedure at a particular lesion to be more readily visible. In particular, the abrasive or other head on the distal tip of the atherectomy device may be made more visible as it approaches and passes through a lesion within an artery element 112.

Each of the seating areas 152 may include one or more illuminating elements 182 arranged beneath it to allow the area to be illuminated. As shown in FIG. 3, an on/off switch 128 may cause the illuminators 182 to be turned on together with other aspects of the system 100 and a rheostat or other control 130 may be provided on the side of the device 100 to control the level of illumination provided by the illuminators 182. As such, a user may control the illumination of the seating areas 152 by dimming or brightening the illuminators 182 with the control 130.

The vascular form base 102 may also include an output screen 122. The screen 122 may be arranged near the top of the working surface 120 and may be relatively centered across the width of the working surface 120. In some embodiments, the screen 122 may be slightly canted to allow a user positioned to the bottom edge of the working surface 120 to more readily see the screen 122. The screen 122 may be supplied with power by the power source 104 and may be in electrical communication with the control holder 106 and may be adapted to display the speed that the advancement knob on the control is being advanced. This speed may reflect the advancement speed of the tip of the atherectomy device and it is advantageous for a user to understand what this speed is such that the speed may be maintained within a suitable range for a patient. The screen 122 may include a numerical indication of the speed and may also include a bar graph with gradations indicating the speed of the device. The bar graph may be dynamic and the bar on the graph may extend upward as the speed increases and get shorter as the speed decreases.

As shown in FIG. 1, the vascular form base 102 may be equipped with an articulable arm 108 and a bracket 110. The articulable arm 108 may be configured to allow the bracket 110 to be arranged and secured in one of several available positions above the working surface 120 of the base 102. The bracket 110, in turn, may be configured to secure tablet, camera, or other computing device or video capture device. As such, an iPad or other device may be arranged in the bracket 110 and positioned above the working surface 120. The video or camera function of the iPad may be activated and zoomed in or focused on a particular portion of the working surface 120 allowing for better visibility of the working surface 120 or a particular portion thereof. In some embodiments, a system of reflective elements may be provided allowing the video or picture capturing device to be pivoted or arranged for more direct viewing by a user while still capturing activity on the working surface 120. Still other arrangements of the articulating arm 108 and bracket 110 may be provided.

The vascular form base 102 may be configured for interfacing with the control holder 106 such that a user may be positioned relatively far from the vascular form base 102 or more proximate to the vascular form base 102. As such, the vascular form base 102 may include a connection port 124 for receiving a communication line or wireless signal from the control holder 106. In some embodiments, the connection port 124 may be arranged on the side wall 134 of the housing 118 of the vascular form base 102 as shown in FIG. 1-3. The vascular form base 102 may also include a power port 126 for connection of a power source 104. In some embodiments, the power port 126 may also be arranged on the side wall 134 of the housing 118 of the vascular form base 102 as shown in FIG. 1-3. The power port 126 may allow for connection of a power source 104 or the power port 126 may more simply be the location that a power cord extends from the vascular form base 102. In some embodiments, as shown, the power source 104 may include an elongated cord allowing for power to be accessed a reasonably large distance from the device. The power cord may include an adaptor allowing the power received from a power outlet, for example, to be converted to more suitable power for powering the electronics of the device. It is to be appreciated that while an external power source is shown, the device may alternatively be battery operated with rechargeable and/or replaceable batteries.

Figure 8:
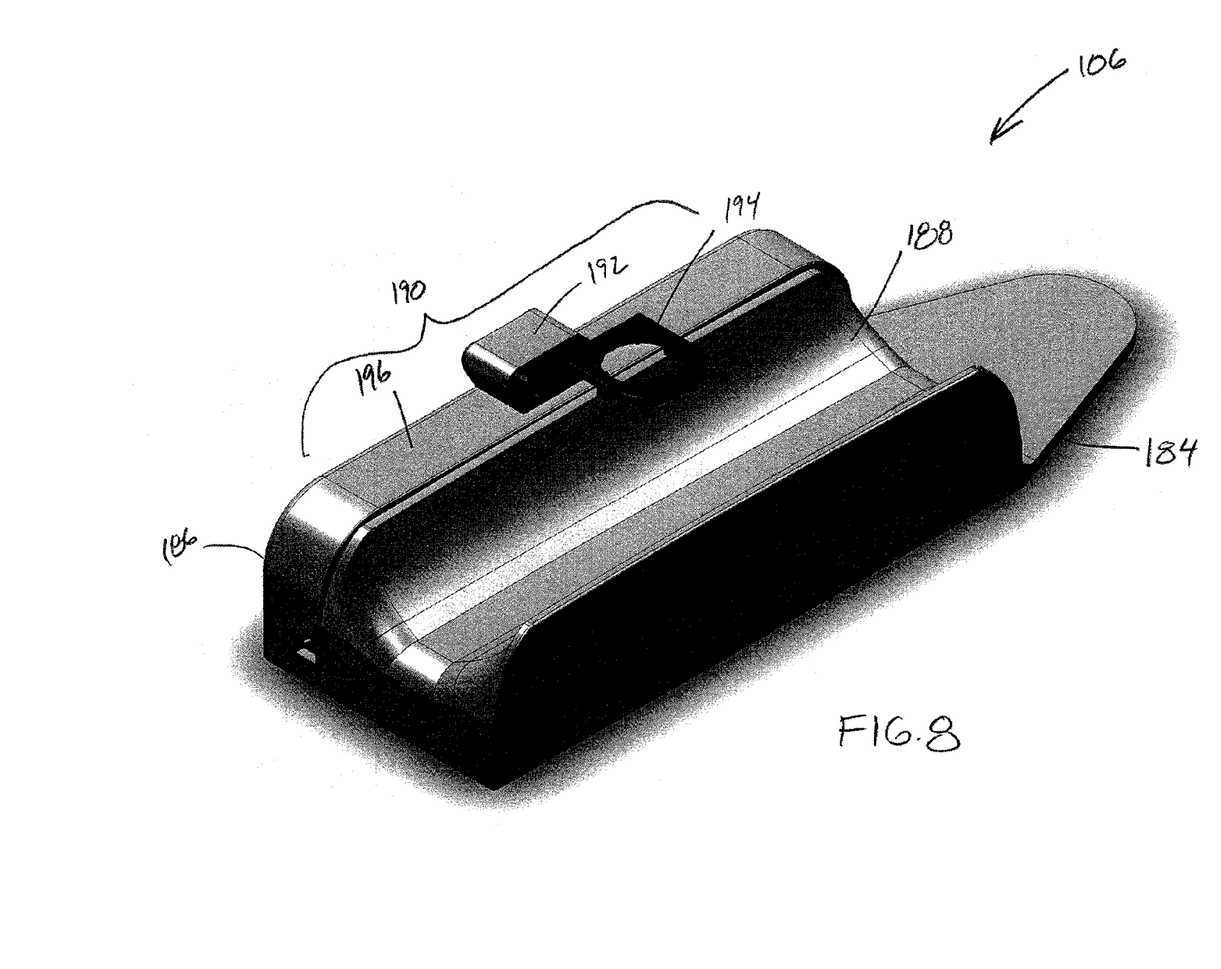
FIG. 8 is a perspective view of a control holder of the system of FIG. 1.

Turning now to FIG. 8, the control holder 106 is shown. As shown, the control holder 106 may be configured for seating engagement of the controller of the atherectomy device. As such, the control holder 106 may include a base 184 and a housing 186 and the housing 186 may include an elongated trough 188 extending along its length. The elongated trough 188 may be adapted to seatingly engage the bottom of the controller to both hold the controller in position and resist relative motion between the controller and the holder 106. As also shown, the control holder 106 may include a motion sensing element 190. The motion sensing element 190 may be configured to sense the speed with which an advancement control is moving along the controller and relative to the control holder 106. The motion sensing element 190 may include a mountable magnet 192 that may be secured to the advancement control of the controller. The mountable magnet 192 may, thus, include a mounting bracket 194 for engaging the advancement control and for supporting the magnet relative to the advancement control in a position adjacent a magnetic sensor 196. The mounting bracket 194 may include a force fit for engaging the advancement control or a clamp, set screw, or other fitting may be used to secure the mounting bracket 194 to the advancement control. With the mounting bracket 194 secured, motion of the advancement control may be reflected by motion of the magnet 192 and the magnetic sensor 196 may sense the speed of the magnet 192 and the advancement control. The control holder 106, may be in communication with the vascular form base 102 and, in particular, in communication with the output screen 122 on the base 102. As such, the speed of the advancement control may be depicted on the output screen 122 of the vascular form base 102. Other types of motion and/or speed sensing device may be used, such as mechanical geared systems, optical sensing systems, or other types of systems.

Figures 9A, 9B, 9C:
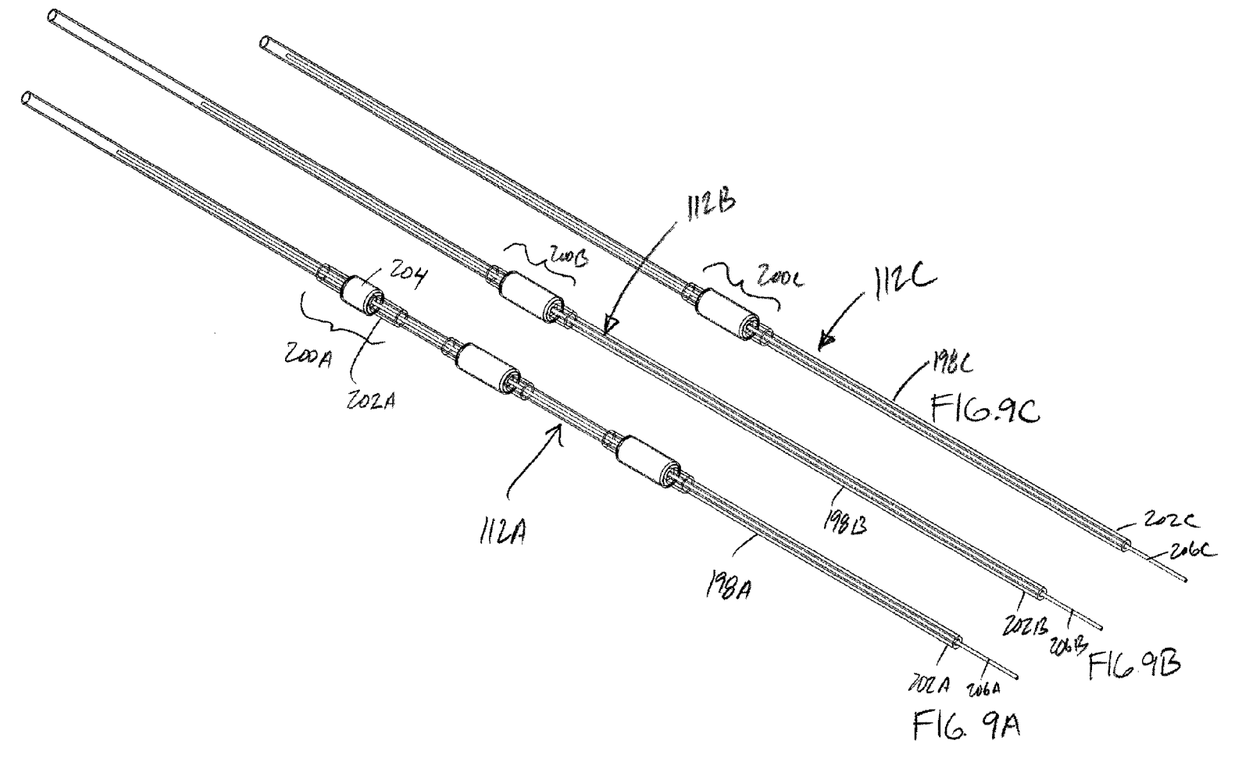
FIGS. 9A, 9B, 9C are each perspective views of an artery element of the system of FIG. 1.

Referring now to FIGS. 9A, 9B, and 9C, a series of artery elements 112 are shown. The artery elements 112 may be configured to represent actual arteries within a patient that may have lesions and/or blockages in them and the artery elements may be adapted to be placed in one or more of the vascular pathways 132 on the working surface 120 of the vascular form base 102. As shown, the artery elements 112 may include artery tubes 198 with lesion/blockage areas 200 arranged along the length. The lesion/blockage areas 200 may be arranged at particular distances along the length of the artery element 112 so as to coincide with the seating areas 152 along the vascular pathways 132 on the working surface 120 of the device of FIGS. 1-3. For example, the artery element 200 of FIG. 9A may include three lesion/blockage areas 200A as shown and, as such, may be adapted for placement in the vascular pathway 132A on the working surface 120 that includes three seating areas. The distance from the distal end 202A of the artery element 112A to the first lesion/blockage 200A may be substantially equal to the distance from the proximal end 154A of the respective vascular pathway 132A to the first seating area 152A along the pathway 132A. The spacing between the first lesion/blockage 200A and the second lesion/blockage 200A of the artery element 112A may also be substantially equal to the distance from the first seating area 152A1 to the second seating area 152A2 along the length of the vascular pathway 132A moving away from the proximal end 154A thereof, and so on.

The lesion/blockage 200 of the artery elements 112 may include a coupling tube 202 sleevably engaging the artery tube 198 at one end and coupled to a lesion element 204 at another end. The lesion element 204 may include a tubular structure with or without an inner lumen and having simulated lesion material arranged therein. In some embodiments, the lesion material may include annunciation material such as dye, ink, or other indicating material or solution arranged in pockets or regions such that when the lesion is abraded or addressed with the atherectomy device, the user may get visual feedback by seeing the annunciation material, or dye, flowing distally through the artery element 112. The lesion element 204 may sleevably engage a coupling tube 202 at each end, wherein, the artery tubes 198, the coupling tubes 202, and the lesion tubes 204 all share a common longitudinal axis. In some embodiments, the artery elements 112 may include a hypotube 206 arranged therein for receiving the guide wire of the atherectomy system as more fully described below. It is to be appreciated that the artery elements 112 may be provided in a quantity equal to the number vascular pathways 132 where each artery element 112 is configured for use with a particular pathway 132. In other embodiments, multiples of the artery elements 112 may be provided. In still other embodiments, the distances between the lesion/blockages 200 and the seating areas 152 may be coordinated such that most any artery element 112 may be used on most any vascular pathway 132. Still other configurations may also be provided.

Figure 10:
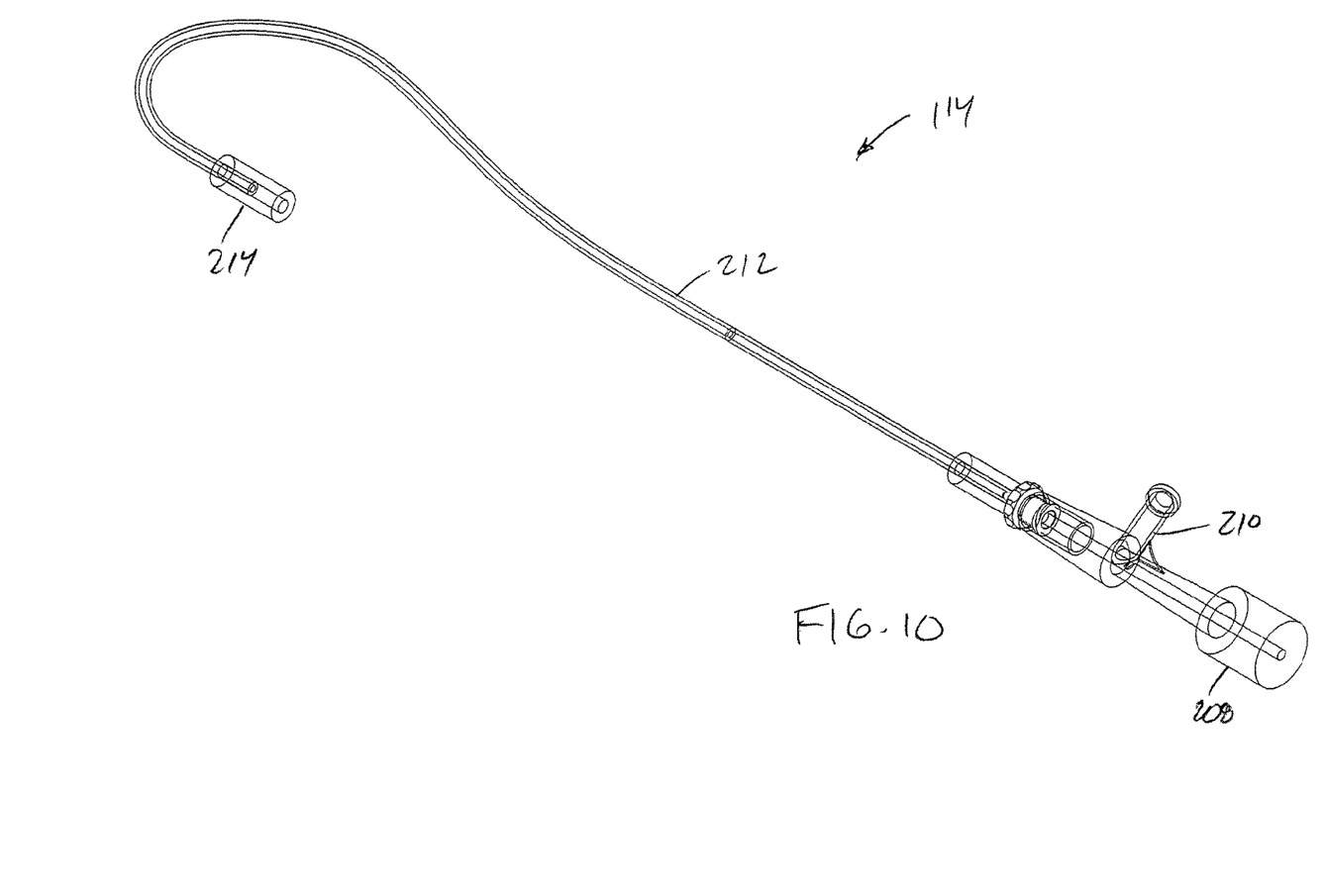
FIG. 10 is a perspective view of an introducing element of the system of FIG. 1.

As shown in FIG. 10, an introducing element 114 may also be provided with the system 100. The introducing element 114 may be configured to receive and allow a drive shaft of an atherectomy device to pass through while also allowing for the connection of fluid to the system. As such, the introducing element 114 may include a driveshaft port 208 and a fluid port 210 connected by a Y-connection and having a check valve therein for preventing backflow of fluid. The introducing element 114 may also include an elongate tube 212 extending from the Y-connection 214 to a distal end where an artery element 114 connector may be provided. The introducing element may be loosely arranged within the entrance structure 136 of the vascular form base 102, thereby being adapted to receive the distal tip of the atherectomy device and adapted for connection of an artery element 112.

In use, the device 100 may be powered on by plugging it into a power source such as an electrical outlet and the device may be turned on. An atherectomy device may be obtained and the controller of the atherectomy device may be arranged on the control holder 106. The mounting bracket 194 of the mountable magnet 192 may be arranged and secured to the advancement control on the controller of the atherectomy device. The introducer 114 may be threaded through and arranged within the entrance element 136 on the working surface 120 of the device. A distal end of the driveshaft of the atherectomy device and an internal guidewire may be inserted into the proximal end 208 of the introducer 114 and advanced through the introducer 114 to the distal end thereof. A portion of the guidewire may be pulled from the distal end of the driveshaft to expose a selected amount of guidewire similar in length to the artery elements 112. The distal end of the guidewire may be inserted into the hypotube 206 of the artery element 112 and advanced through the artery element 112. The presence of the hypotube 206, thus, allows for quickly inserting the guidewire through the artery element 112 without encountering difficulty at or around the lesion/blockage areas. The guidewire may be advanced fully through the artery element 112 and then the hyoptube 206 may be pulled from the artery element 112 and off of the distal end of the guidewire. The proximal end of the artery element 112 may then be secured to the artery element connector 214 on the distal end of the introducing element 114. The artery element 112 may then be placed into a suitable vascular pathway 132 on the working surface 120 of the device 100. This may be performed by pressing the artery element 112 into the pathway and securing the distal end of the artery element 112 to the pathway 132 by way of the keeper elements 158 on the pathway 132. Depending on the need for restriction of one or more lesion/blockages 200 of the artery element 112, the pin 172 on the restricting elements 164 may be advanced to restrict the area available for passing through a particular lesion/blockage 200 of the artery element 112. A drain tube may also be connected to the distal end of the artery element 112 and a fluid supply may be connected to the proximal end 210 of the introducing element.

Visualization may be accommodated by adjusting the intensity of the illumination elements 182 with the illumination control 130 and/or by assembling the articulating arm 108 and tablet bracket 110 together with placement of a tablet. The camera or video function of the tablet may be activated and focused on a particular seating area 152 or the overall working surface 120 or part thereof.

Having assembled the simulation device 100 with an atherectomy device, a procedure may be performed by activating the atherectomy device, advancing the distal tip of the drive shaft to the lesion/blockage areas 200 of the artery element 112 and clearing and/or otherwise addressing the lesion/blockage 200 of the artery element 112. As suggested in the description of the artery element 112, when the lesion/blockage 200 is addressed, visual feedback in the way of ink release may be provided when the abrading element causes the ink to be released from the lesion/blockage 200. All of the lesion/blockage areas 200 of the artery element 112 may be addressed. As the distal end of the drive shaft is advanced through the artery element 112, the speed of advancement may be viewed by the user on the output screen 122 in the form of a numerical speed and/or a bar graph showing how quickly the distal tip is being advanced.

The process may be repeated with other artery elements 112 or the same artery element 112. Where the lesion/blockage area 200 is largely open or more open than desired, the pin 172 on the restricting element 164 may be advanced to pinch the lesion/blockage 200 allowing each of the lesion/blockage areas 200 to be "cleared" multiple times before the artery element 112 is replaced.

While the present disclosure has been described with reference to various embodiments, including preferred embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A simulation system, comprising:
   a base with a working surface;
   a covered entrance structure on the working surface having a distal end;
   at least one artery element configured to simulate an artery with a blockage, the blockage comprising a blockage material and adapted to receive a distal portion of a handheld manually manipulated device, the artery element containing an annunciation material arranged in pockets within the blockage material for providing visual feedback to a user; and
   three vascular pathways extending from the distal end of the covered entrance structure and arranged on the working surface and configured for securing the at least one artery element to the base, each vascular pathway comprising a length and at least one curve, wherein the length and at least one curve of each vascular pathway differ from the lengths and curves of the other vascular pathways and wherein a first vascular pathway comprises one artery element and wherein a second vascular pathways comprises more than one artery element.

2. The device of claim 1, wherein the at least one artery element includes a lesion portion and each of the three vascular pathways includes at least one seating area for the lesion portion of the at least one artery element.

3. The simulation device of claim 2, wherein the at least one seating area is proximate the at least one curve.

4. The simulation device of claim 2, wherein the at least one seating area is on the at least one curve.

5. The simulation device of claim 1, further comprising an output element adapted to display a speed of the distal portion of the handheld manually manipulated device.

6. The simulation device of claim 5, further comprising a control holder adapted to hold the handheld manually manipulated device.

7. The simulation device of claim 6, wherein the control holder is in communication with the output element and includes a motion sensing element configured to sense a speed of an advancement element on the controller.

8. The simulation device of claim 7, wherein the motion sensing element includes a magnetic reed switch.

9. The simulation device of claim 8, wherein the motion sensing element includes a mountable magnet configured for securing to the advancing element on the controller.

10. The simulation device of claim 1, further comprising the covered entrance element resembling a tortuous cardiovascular structure.

11. The simulation device of claim 10, wherein the covered entrance element resembles an aorta.

12. The simulation device of claim 2, wherein each of the three vascular pathways include a recessed pathway and wherein each of the at least one seating areas includes an enlarged recessed pathway.

13. The simulation device of claim 12, wherein the three vascular pathways include a restricting element configured for adjusting an amount of restriction provided by the lesion in the artery element.

14. The simulation device of claim 13, wherein the restricting element includes a pressure pin.

15. The simulation device of claim 2, wherein the seating areas include backlighting.

16. The simulation device of claim 15, wherein the backlighting comprises one or more illuminators arranged below the working surface and the working surface is translucent.

17. A simulation system for use with an artery element configured to simulate an artery with a blockage comprising a blockage material and adapted to receive a distal portion of an atherectomy device, the system comprising:
    a base with a working surface;
    a vascular pathway arranged on the working surface and configured for securing the artery element to the base, the vascular pathway having a seating area for arrangement of the blockage, the artery element containing an annunciation material arranged within the blockage material for providing visual feedback to a user; and
    an illumination element arranged below the seating area.

18. The simulation system of claim 17, further comprising a control holder configured to sense an advancement speed of an advancement element on the controller.

19. The simulation system of claim 18, wherein the base comprises an output display and the control holder is in communication with the output display for displaying the advancement speed of the advancement element.

* * * * *